United States Patent [19]

Yamanaka et al.

[11] Patent Number: 4,860,001
[45] Date of Patent: Aug. 22, 1989

[54] REMOTE MONITORING AND CONTROLLING SYSTEM

[75] Inventors: Torao Yamanaka; Takeshi Kawahara, both of Kobe, Japan

[73] Assignee: Mitsubishi Denki Kabushiki Kaisha, Japan

[21] Appl. No.: 108,079

[22] Filed: Oct. 14, 1987

[30] Foreign Application Priority Data

Mar. 2, 1987 [JP] Japan ................................. 62-45267

[51] Int. Cl.[4] ............................................. H04Q 1/00
[52] U.S. Cl. ......................... 340/825.200; 340/825.06; 340/825.07
[58] Field of Search ...................... 340/825.06, 825.07, 340/825.08, 825.12, 825.13, 825.2, 825.21, 825.14; 368/52, 46, 47; 375/106, 107; 370/91, 96

[56] References Cited

U.S. PATENT DOCUMENTS

| 3,798,650 | 3/1974 | McComas et al. | 375/107 |
| 3,801,981 | 4/1974 | Alpers | 375/107 X |
| 3,889,461 | 6/1975 | Marti et al. | 368/52 |
| 4,149,144 | 4/1979 | Diefenerfer | 370/96 |

FOREIGN PATENT DOCUMENTS 57-69496 4/1982 Japan .

OTHER PUBLICATIONS

"Definition, Specification, and Analysis ... Control and Data Acquisition", American National Standard, 1979, p. 13.

Primary Examiner—Ulysses Weldon
Attorney, Agent, or Firm—Leydig, Voit & Mayer

[57] ABSTRACT

A remote monitoring and controlling system in which time information from a secondary clock in each slave station is transmitted in coded signal form to a master station in response to a time inquiry command issued from the master station. The transmitted time information and the time information of the primary clock of the master station are compared in the master station by taking into account the length of the coded signal and a transmission delay time from the corresponding slave station. The difference found by the comparison is temporarily stored in memory as time correction data to be used to correct the time information of the respective slave stations.

3 Claims, 4 Drawing Sheets

REMOTE MONITORING AND CONTROLLING SYSTEM

BACKGROUND OF THE INVENTION

This invention relates to a remote monitoring and controlling system wherein phenomena which have occurred in a plurality of slave stations have their time relations sequenced as a whole and are then processed and recorded.

In recent years, advances in the administration of an electric power system have made it necessary to exactly record and analyze the operating times and operating sequence of protective devices and various equipment in electric power stations over a large area.

In this regard, a conventional remote monitoring and controlling system includes a primary clock in a master station and secondary clocks in respective slave stations synchronization between the clocks is cyclically carried out to hold the time differences of all the clocks within a prescribed value. Signals representative of operations of certain protective devices and equipment are transmitted from the slave stations to the master station with the time data of the respective secondary clocks included. In the master station, the signals are sequenced on the basis of the included time data and then displayed and recorded.

In this case, the primary clock and the secondary clocks need to be synchronized. Since, however, the number of transmission channels between the master station and the slave stations is limited and delays are involved in the signal transmission, a special contrivance is necessary for the synchronization.

FIG. 3 is a block diagram which shows a prior-art remote monitoring and controlling system disclosed in Japanese Patent Application Laid-open No. 69496/1982. Referring to the figure, the system consists of a master station 0 and slave stations 1, 2, . . . . The master station 0 includes a display panel 3 which displays the status of each of the slave stations 1, 2, . . . , a console 4 which issues control commands to the respective slave stations 1, 2, . . . , a typewriter 5 which records operations and data, a processing circuit 6, an output circuit 7 which connects the display panel 3 to the processing circuit 6 through a bus, an input circuit 8 which connects the console 4 to the processing circuit 6 through the bus, a typewriter control circuit 9 which connects the typewriter 5 to the processing circuit 6 through the bus, a primary clock 10 which is connected to the processing circuit 6 through the bus, a code sending/receiving circuit 11 which is connected to the processing circuit 6 through the bus, and a modem 12 which is connected to the code sending/receiving circuit 11.

The slave station 1 includes a processing circuit 13a, a code sending/receiving circuit 14a which is connected to the processing circuit 13a through a bus, a modem 15a which is connected to the code sending/receiving circuit 14a, an input circuit 16a which is connected to the processing circuit 13a through the bus, an output circuit 17a which is connected to the processing circuit 13a through the bus, and a secondary clock 18a which is connected to the processing circuit 13a through the bus. The slave station 2 is identical in arrangement to the slave station 1, and the corresponding constituents of the former are respectively assigned the same symbols as the latter except for suffixes b replacing a.

Further, a signal transmission line 19a connects the modem 12 of the master station 0 and the modem 15a of the slave station 1. A signal transmission line 19b connects the modem 15a of the slave station 1 and the modem 15b of the slave station 2.

Next, the operation will be described. As illustrated in a timing chart of FIG. 4, the master station 0 sends a data request code "DRQ$_2$" to the slave station 2 by way of example. This data request code "DRQ$_2$" reaches the slave station 1 after a transmission delay time $\tau_1$, and reaches the slave station 2 after a transmission delay time $\tau_2$. When the processing circuit 13b of the slave station 2 identifies that the data request code "DRQ$_2$" that has arrived is directed to its own station, it returns the data "DOT$_2$" reporting its latest status. The processing circuit 6 of the master station 0 stores the data, and displays it on the display panel 3 through the output circuit 7. By repeating such operations, the master station 0 monitors and controls the slave stations 1, 2, . . . .

When the time for time synchronization approaches (for example, 0 a.m. to which the time is set once a day), the processing circuit 6 of the master station 0 sends the respective slave stations 1, 2, . . . a time setting code "TSE" into which the time $t_0$ to be set (for example, 0 hour 0 minute 0 second 0 millisecond a.m.) has been encoded. When the respective slave stations 1, 2, . . . receive the code, the processing circuits 13a, 13b, . . . temporarily store the aforementioned time $t_0$ to be set and wait for the subsequent arrival of a setting command signal "SET" . The processing circuit 6 of the master station 0 monitors the output of the primary clock 10 and transmits the setting command signal "SET" when the time $t_0$ to be set has been reached. The setting command signal "SET" arrives at the slave stations after the transmission lags, namely, at the slave station 1 at a time $t_0+\tau_1$ and at the slave station 2 at a time $t_0+\tau_2$. Upon the arrival of the setting command signal "SET," the processing circuits 13a, 13b, . . . of the respective slave stations 1, 2, . . . add the transmission delay times $\tau_1$, $\tau_2$, . . . previously stored therein on the basis of measurements, to the value $t_0$ of the time setting code "TSE," and they set the corresponding secondary clocks 18a, 18b, . . . to the resulting times $t_0+\tau_1$, $t_0+\tau_2$, . . . . Thus, the times of the secondary clocks 18a, 18b, . . . of the respective slave stations 1, 2, . . . are conformed to the time of the primary clock 10 of the master station 0.

Since the prior-art remote monitoring and controlling system is constructed as described above, the respective secondary clocks 18a, 18b, . . . must be kept exactly synchronous with the primary clock 10 in order that phenomena that occur in the slave stations 1, 2, . . . may have their time relations sequenced before they are processed. The synchronizing operation requires complicated control processes in which the transmission lag times must be taken into consideration. The synchronizing operation must be performed through the signal transmission lines 19a, 19b, . . . which have limited transmission capacity.

SUMMARY OF THE INVENTION

This invention has the objective of eliminating the problems mentioned above, and has as a main object the provision of a remote monitoring and controlling system in which phenomena that occur in individual slave stations can have their time relations sequenced and subsequently processed without synchronizing secondary clocks with a primary clock.

The remote monitoring and controlling system according to this invention comprises means for transmitting information representative of the time of a secondary clock from each slave station to the master station in response to a time inquiry command issued from the master station, means for comparing the transmitted time information and the time of a primary clock in the master station, taking into account a code length and a transmission delay time from the corresponding slave station, means for storing a difference found by the comparison in a memory as time correction data, and means for correcting data information which is thereafter transmitted from the corresponding slave station before the next time inquiry using the time correction data stored in the memory.

With the remote monitoring and controlling system of this invention, no complicated operations are necessary for synchronizing each secondary clock to the primary clock. The time which each secondary clock gains or loses relative to the primary clock is utilized as the time correction data in the master station, and phenomena that have occurred in the respective slave stations are precisely sequenced as a whole in accordance with the corrected times on the basis of the time correction data.

BRIEF DESCRIPTION OF THE DRAWINGS

Throughout the drawings, the same symbols indicate identical or equivalent portions.

DESCRIPTION OF THE PREFERRED EMBODIMENT

Figure 1:
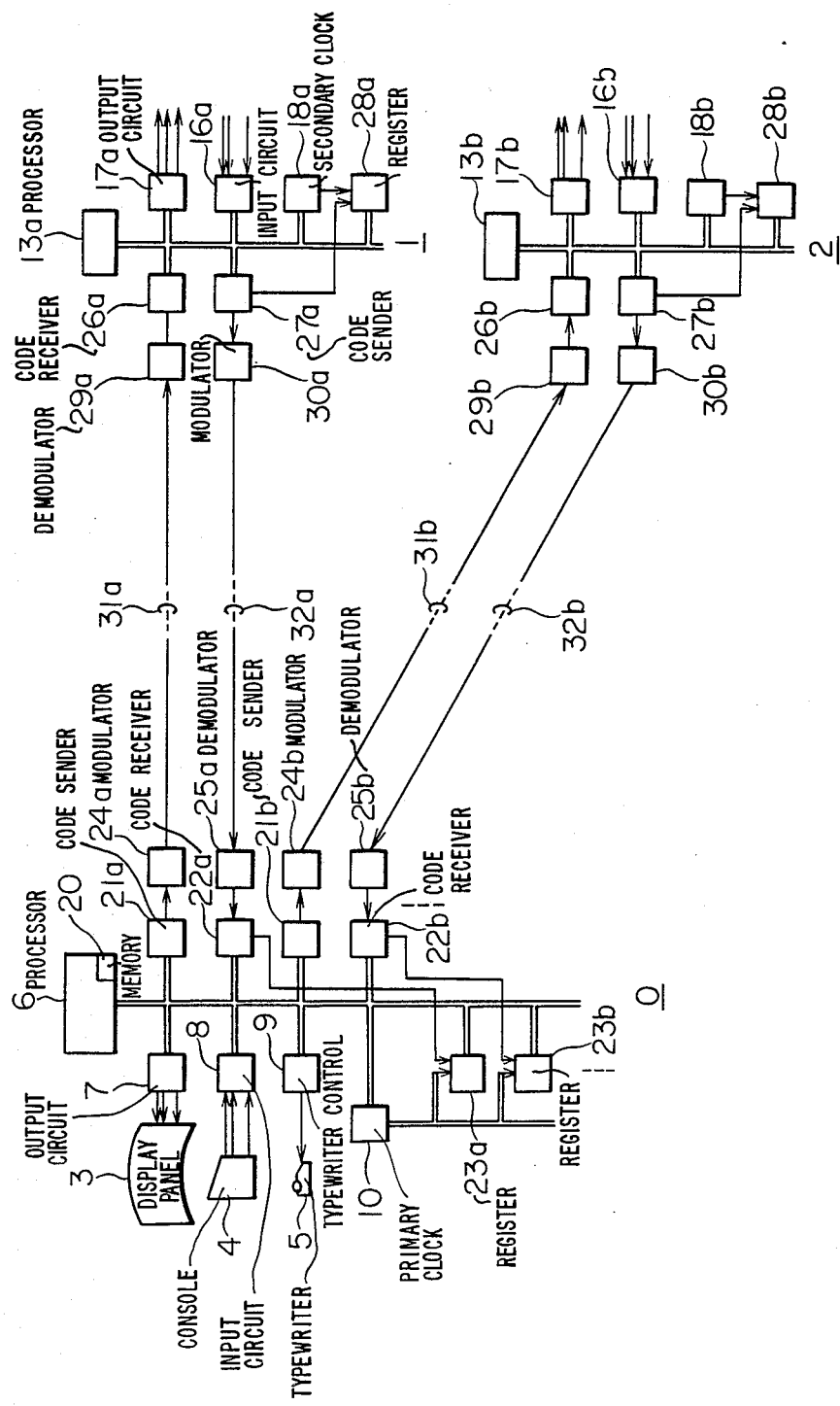
FIG. 1 is a block diagram showing a remote monitoring and controlling system according to an embodiment of the invention.
Figure 3:
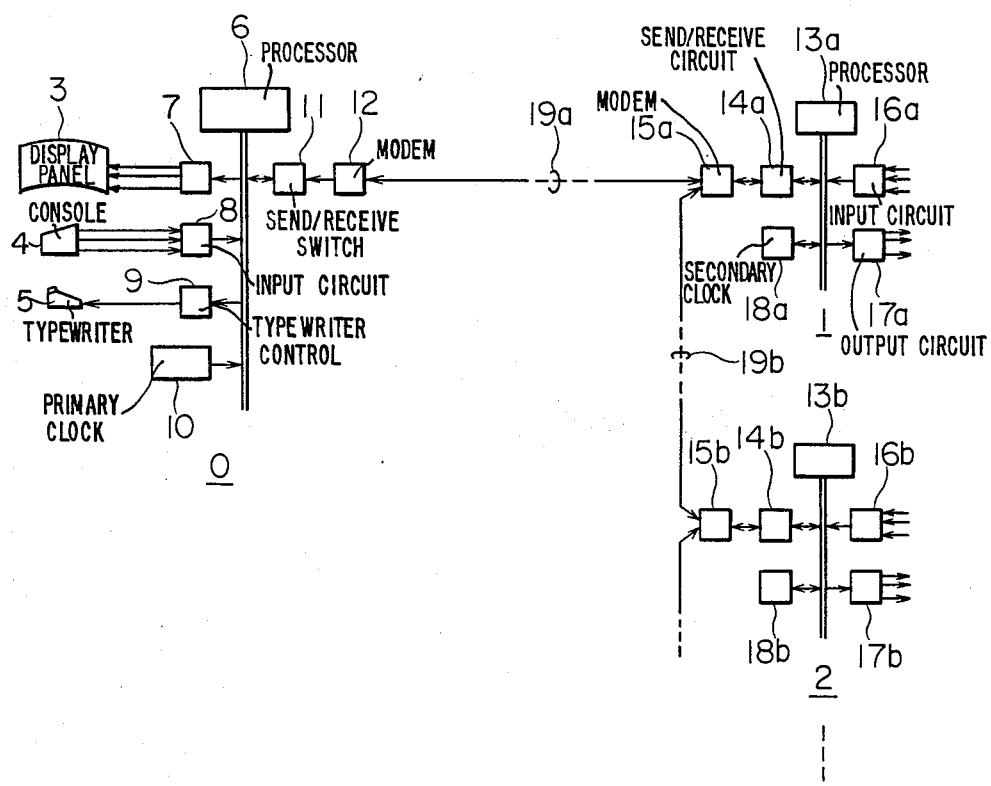
FIG. 3 is a block diagram showing a remote monitoring and controlling system of the prior art.
Figure 4:
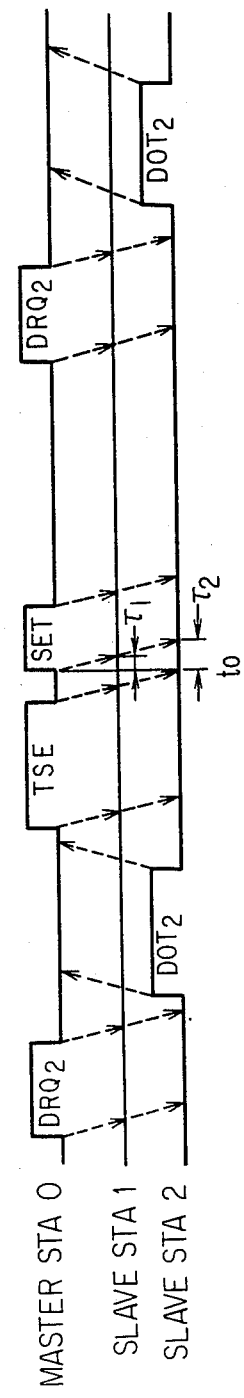
FIG. 4 is a timing chart for explaining the operation of the prior art system of FIG. 3.

Referring to FIG. 1, the embodiment includes a master station 0 and slave stations 1, 2, . . . . The master station 0 includes a display panel 3, a console 4, a typewriter 5, a processing circuit 6, an output circuit 7, an input circuit 8, a typewriter control circuit 9, and a primary clock 10. The slave station 1 includes an processing circuit 13a, an input circuit 16a, an output circuit 17a, and a secondary clock 18a. Since the elements mentioned above are identical or equivalent to the elements of the prior art system assigned the same symbols in FIG. 3, the detailed description thereof is omitted.

In addition, the master station 0 includes a memory 20 which is built in the processing circuit 6, code sending circuits 21a, 21b, . . . which are connected to the processing circuit 6 through a bus, code receiving circuits 22a, 22b, . . . which are connected to the processing circuit 6 through the bus, registers 23a, 23b, . . . which are connected to both the processing circuit 6 and the primary clock 10 through the bus registers 23a, 23b, correspond with the code receiving circuits 22a, 22b, . . . , modulator circuits 24a, 24b, . . . which are respectively connected to corresponding code sending circuits 21a, 21b, . . . , and demodulator circuits 25a, 25b, . . . which are respectively connected to corresponding code receiving circuits 22a, 22b, . . . . The slave station 1 includes a code receiving circuit 26a which is connected to the processing circuit 13a through a bus, a code sending circuit 27a which is connected to the processing circuit 13a through the bus, a register 28a which is connected to both the processing circuit 13a and the secondary clock 18a through the bus and which is also connected to the code sending circuit 27a, a demodulator circuit 29a which is connected to the code receiving circuit 26a, and a modulator circuit 30a which is connected to the code sending circuit 27a.

Here, the slave station 2 is identical in arrangement to the slave station 1, and the corresponding constituents of the former are respectively assigned the same symbols as the latter, except for suffixes b replacing the suffixes a.

Further, symbols 31a, 31b, . . . denote signal transmission lines which connect the modulator circuits 24a, 24b, . . . of the master station 0 and the demodulator circuits 29a, 29b, . . . of the slave stations 1, 2, . . . , respectively, while symbols 32a, 32b, . . . denote signal transmission lines which connect the demodulator circuits 25a, 25b, . . . of the master station 0 and the modulator circuits 30a, 30b, . . . of the slave stations 1, 2, . . . , respectively.

An ordinary case of performing a remote monitoring control and operation recording will be explained in accordance with a timing chart of FIG. 2.

In the arrangement of FIG. 1, the processing circuit 13a of the slave station 1 scans the status of contacts being monitored (such as the auxiliary contacts of a protective relay and a circuit breaker) applied to the input circuit 16a and stores the status information. If any of the contacts being monitored undergoes a status change, the processing circuit 13a delivers the address number and new status of the contact to the code sending circuit 27a. The code sending circuit 27a is sending codes toward the master station 0 at all times. When circuit 27a receives from the processing circuit 13a the data items of the address and new status of the contact that has undergone the status change, it carries them in a code frame next to the code being sent at that time and delivers them to the modulator circuit 30a. An example of the code which the code sending circuit 27a sends is shown at $S_1$ in FIG. 2. In FIG. 2, letter D denotes the frame of each code, and letter F denotes a flag indicative of the separator between the frames D. (Although the pattern of the flags F is fixed, the frames D including the lengths thereof change depending upon the contents being sent. As regards each of the contents, a control part for ensuring the sending and reception and a part for checking the code are usually added to the data being sent. The format of the code is, for example, that of the high-level data link control procedure (HDLC procedure)).

Referring back to FIG. 1, the modulator circuit 30a modulates the code received from the code sending circuit 27a, into a form suited to the signal transmission line and less susceptible to noise, for example, a frequency shift keying (hereinbelow, termed "FSK") signal. The modulated code is transmitted to the master station 0 through the signal transmission line 32a. In the master station 0, the demodulator circuit 25a receives the code and demodulates it into a D.C. pulse, which is delivered to the code receiving circuit 22a.

Figure 2:
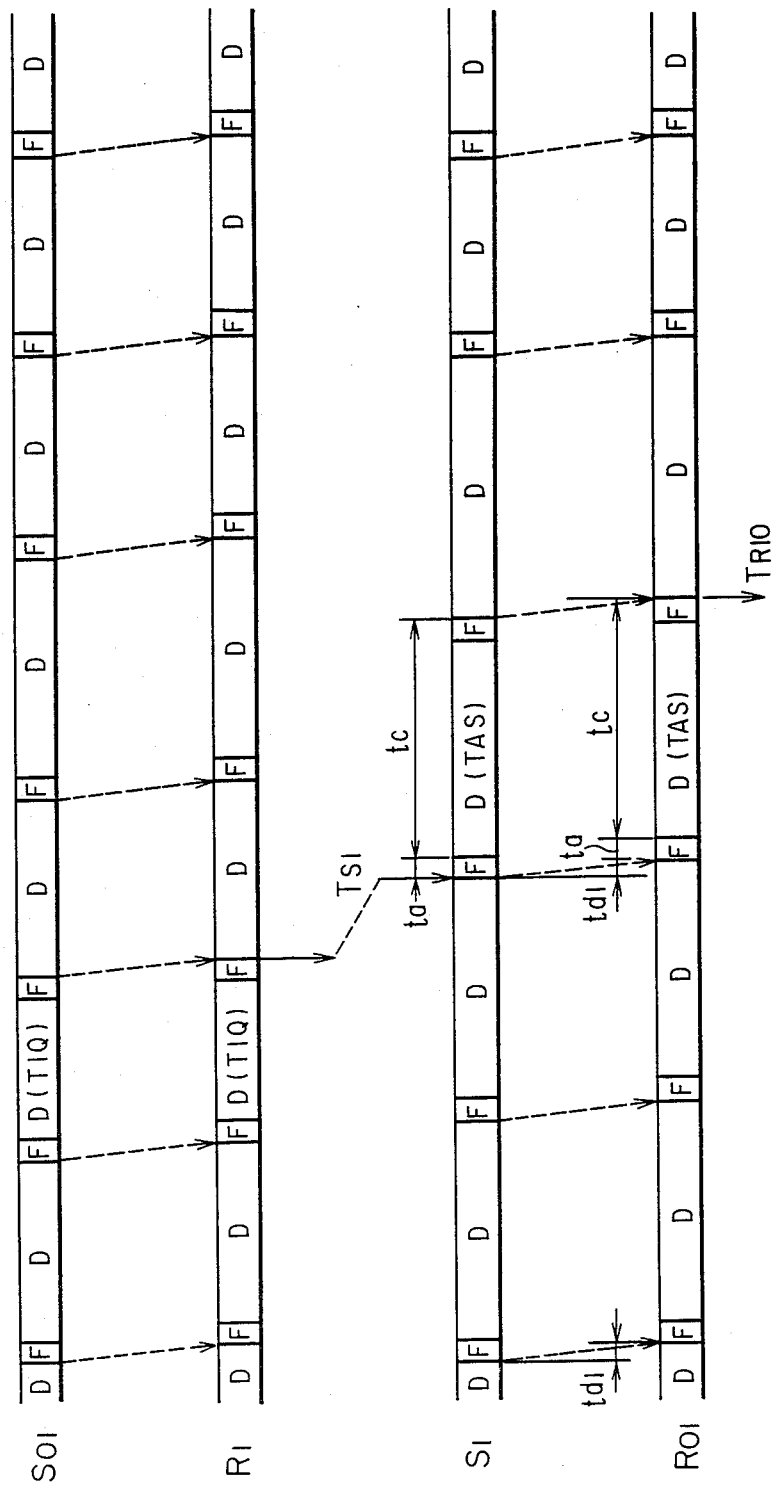
FIG. 2 is a timing chart for explaining the operation of the system of FIG. 1.

The code which reaches the code receiving circuit 22a is similar to the sending code $S_1$ as shown at $R_{01}$ in FIG. 2, but it lags by a code transmission delay time $td_1$.

The processing circuit 6 of the master station 0 reads the received contents by cyclic scanning or in response to an interrupt signal from the code receiving circuit 22a, and upon arrival of the data of the status change, it updates the contents of the memory 20 and changes the display of the display panel 3 through the output circuit 7. Besides, it operates to record the status change by means of the typewriter 5 through the typewriter control circuit 9.

The processing circuit 6 of the master station 0 also scans inputs from the console 4 through the input circuit 8. When a command for selecting and controlling any of the equipment of the slave station 1 is received by processing circuit 6, it encodes the address and control status instruction (such as turn-on or -off) of the corresponding device and sends it to the code sending circuit 21a. The code sending circuit 21a sends a code shown at $S_{o1}$ in FIG. 2 that carries the aforementioned address and control status instruction in one frame of the sending code $S_{o1}$. Code sending circuit 21a transmits the instruction to the code receiving circuit 26a of the slave station 1 through the modulator circuit 24a, transmission line 31a and demodulator circuit 29a. The processing circuit 13a of the slave station 1 reads the received contents by cyclic scanning or in response to an interrupt signal from the code receiving circuit 26a. It checks the received instruction and decodes it, and gives a control command to the corresponding device through the output circuit 17a.

Since the above operations are quite similar to those of the slave station 2, the description of that station is omitted. The further slave stations, not shown, are similarly arranged and added, and are operated quite similarly.

The sequence described above is the ordinary operation of the remote monitoring control and operation recording. Meanwhile, in case of recording operations in the master station 0, data items on times at which status changes have occurred do not come from the respective slave stations 1, 2, . . . with the ordinary operation described above, and hence, there is no method other than one wherein the operations are recorded in a sequence in which the processing circuit 6 of the master station 0 has acknowledged them (with the times of the primary clock 10 attached to the data items of the operations). In a case where, as in an electric power system, the operation of protective devices and equipment are much faster, with respect to periods of time required for transmitting codes through a data transmission system, the operating sequence cannot be exactly discriminated by the use of the points of time at which the data items have reached the master station 0.

In order to solve this drawback, the respective slave stations 1, 2, . . . are furnished with the secondary clocks 18a, 18b, . . . , and the times of the secondary clocks 18a, 18b, . . . are transmitted to the master station 0 together with the status changes that have arisen. More specifically, in a case where the status of which is applied to the input circuit 16a, the processing circuit 13a sends the master station 0 the time of the secondary clock 18a together with the address number and new status of the corresponding contact. In the master station 0, the processing circuit 6 stores these data items in its own memory 20 and also gathers data items from the other slave stations 2, . . . for a fixed time interval. At the end of the interval, processing circuit 6 arranges all the stored data items in the order of the attached times and causes the typewriter 5 to print them out through the typewriter control circuit 9. Then, an operator can know the correct operating times and the sequence of the data items.

The master station 0 needs to determine the time differences between the primary clock 10 and the secondary clocks 18a, 18b, . . . of the respective slave stations 1, 2, . . . precisely (for example, within several milliseconds), to correct the time data items sent from the slave stations 1, 2, . . . . The method of determining the time differences is described herebelow.

The processor 6 of the master station 0 sends a time inquiry command for checking the times of the secondary clocks 18a, 18b, . . . , to the respective slave stations 1, 2, . . . through the corresponding code sending circuits 21a, 21b, . . . once every predetermined time interval (every hour to every day, depending upon the precision of the secondary clocks 18a, 18b, . . .).

The slave station 1 will be referred to. First, during the ordinary operation, there are repeated operations wherein the code sending circuit 27a applies a signal to the register 28a at a time which precedes the start of the sending of a code frame by a preset time interval $t_a$ and wherein the register 28a loads and stores the time of the secondary clock 18a at the point of time at which the signal has arrived. When the processing circuit 6 of the master station 0 issues the time inquiry command signal, the code sending circuit 21a transmits this signal to the code receiving circuit 26a of the slave station 1 through the modulator circuit 24a, transmission line 31a and demodulator circuit 29a. This operation is illustrated as D(TIQ) in the time chart of FIG. 2.

When the code receiving circuit 26a receives the time inquiry command D(TIQ), the processing circuit 13a of the slave station 1 puts the data stored in the register 28a, in the next code frame. As shown at a part above the sending code $S_1$ in FIG. 2, the data of the register 28a contains the time of the secondary clock 18a preceding the next frame by $t_a$ (in this example, the time is the point of time at the end of the sending of the previous frame). Letting $T_{s1}$ denote the time, this time $T_{s1}$ is transmitted to the code receiving circuit 22a of the master station 0 through the code sending circuit 27a, modulator circuit 30a, transmission line 32a and demodulator circuit 25a as the time information of the secondary clock 18a in the next frame D(TAS).

As shown at $R_{o1}$ in FIG. 2, a code which arrives at the code receiving circuit 22a is the same as the sending code $S_1$ but lags by the code transmission delay time $t_{d1}$. When the code receiving circuit 22a has ended the reception of the frame carrying the time information $T_{s1}$ of the secondary clock 18a, it loads the time $T_{R10}$ of the primary clock 10 at that point of time and stores it in the register 23a.

The processing circuit 6 of the master station 0 reads out the time information $T_{R10}$ from the primary clock 10 entered in the register 23a, and it obtains the supposed time $T_{S10}$ of the primary clock by subtracting, from the read time information, trio, the sum of: (i) the length $t_c$ of one code frame, which is known beforehand; (ii) the aforementioned time interval $t_a$, which elapses from the reading of the secondary clock time to the transmission of the code; and (iii) the code transmission delay time $t_{d1}$. When the difference $(T_{S10}-T_{S1})$ between the supposed time $T_{S10}$ and the time information $T_{S1}$ of the secondary clock 18a, having been carried by the frame D(TAS) from the slave station 1, is determined, it becomes the difference between the time of the primary clock 10 and the secondary clock 18a and is stored in the memory 20 of the processing circuit 6 as the time correction data of the secondary clock 18a.

The above operation of inquiring about the time of the secondary clock is similarly performed for the slave stations 2 et seq. More specifically, FIG. 2 shows the time chart of the codes which are sent and received in the case of making the inquiry about the time of the secondary clock 18a of the slave station 1 between the master station 0 and the slave station 1, and the steps are quite similar for the slave stations 2, et seq. In general, in case of the slave station n, the code sending circuit 21a is replaced with 21n, the code receiving circuit 26a with 26n, the code sending circuit 27a with 27n, and the code receiving circuit 22a with 22n, and the time information $T_{S1}$ of the secondary clock is replaced with $T_{Sn}$. The time interval $t_a$ taken from the reading of the time until the transmission of the code in the slave station, and the length $t_c$ of the code can be equalized for all the slave stations 1, 2, .... On the other hand, the code transmission delay time is, in general, different for the individual slave stations 1, 2, .... Thus, the delay time interval $t_{d1}$ is replaced with $t_{dn}$, and the time $T_{R10}$ of the primary clock 10 at the point of time at which the code reception ends is replaced with $T_{Rn0}$.

Owing to the above operation of the inquiry regarding the secondary clock time, the time differences between the primary clock 10 and the respective secondary clocks 18a, 18b, ... are stored as the time correction data items in the memory 20 of the processing circuit 6 of the master station 0. Thenceforth, the time contained in data received from the slave station 1 has the time difference $(T_{S10}-T_{S1})$ added thereto, and in general, the time contained in data received from the slave station n has the time difference $(T_{Sn0}-T_{Sn})$ added thereto, whereby the time differences are corrected. Then, the time contained in data items from all the slave stations 1, 2, ... can be gathered and processed with the correct times and in the correct time sequence.

The above operation of inquiring about the secondary clock times may be performed at a cycle within a time interval in the range of the allowable time differences of the secondary clocks 18a, 18b, ... , in accordance with the accuracy of the secondary clocks 18a, 18b, .... By way of example, in a case where the accuracy of each of the secondary clocks 18a, 18b, ... is 0.2 seconds in terms of the daily rate and where phenomena extending over the different slave stations 1, 2, ... need to be exactly sequenced at a resolution of 10 msec., the time inquiries of the secondary clocks 18a, 18b, ... must be made at least twenty times a day in accordance with 0.2/0.01=20, and the time inquiry operation may be performed once per hour.

Here, the code transmission delay time $t_{dn}$ between the master station 0 and each of the slave stations 1, 2, . . . may be measured at the installation stage of the data transmission system by the turn-back test of the modulator and demodulator circuits. For example, in the arrangement of FIG. 1, the modulator circuit 24a and demodulator circuit 25a of the master station 0 and the modulator circuit 30a and demodulator circuit 29a of the slave station 1 are disconnected from internal circuitry. The output of the demodulator circuit 29a is connected to the modulator circuit 30a in the slave station 1, the time lag before the change of the input code of the modulator circuit 24a of the master station 0 appears in the output of the demodulator circuit 25a is measured, and the measured time lag is divided by 2. The measured delay time may be stored as data in the memory 20 of the processing circuit 6 of the master station 0.

In the embodiment, there has been exemplified the correcting measure wherein the time of the primary clock is temporarily stored in the register, the total of the time interval that elapses until the sending of the code, the length of the code, and the code transmission delay time is subtracted from the stored time so as to obtain the supposed time of the corresponding secondary clock, and the difference between the supposed time and the time information of the secondary clock sent from the corresponding slave station is set as the time correction data. Time correction data can also be obtained as the difference between the designated time of a secondary clock, in which the total of the code transmission delay time, the time interval that elapses until the sending of a code, and the length of the code is added to the time from the secondary clock that arrives from the corresponding slave station, and the time information of the primary clock at the point of time at which the reception of a code frame carrying the time information of the secondary clock ends.

Further, the embodiment has referred to the system wherein the master station and the respective slave stations send codes at all times. The invention, however, may well be applied to another code system, for example, a system wherein codes are not always sent, but in which the respective slave stations send codes in response to polling from the master station. Besides, when the time correcting operations of the secondary clocks of the respective slave stations are successively performed in a manner to handle one station at a time by way of example, a single register can also be shared without disposing the registers of the master station in correspondence with the individual slave stations. The invention can take such various constructions.

As described above, this invention is so constructed that a master station inquires about the times of respective secondary clocks at a proper cycle, to determine the time-keeping situations of the secondary clocks and to correct the time of data arriving from respective slave stations. Therefore, the invention is effective to realize a remote monitoring and controlling system in which phenomena extending over a plurality of slave stations can have their accurate times determined and be correctly set in time sequence without performing a complicated operation for synchronizing the respective secondary clocks to a primary clock.

What is claimed is:

1. In a remote monitoring and controlling system having a master station including a primary clock and a plurality of slave stations each having a respective secondary clock, the master and slave stations exchanging coded time information in information frames of fixed duration, in which the respective slave stations monitor the status of various conditions and report to the master station changes in status, and the times of status changes, of the monitored conditions, and the reported changes in status from the various slave stations are placed in time sequence by the master station, a method for determining a time correction for each of said secondary clocks relative to said primary clock comprising:

sending a clock time inquiry command from said master station to each of said slave stations;
receiving from each respective slave station coded time information including (i) a time reading of said secondary clock of the respective slave station, and (ii) a time interval that elapses between the reading of said secondary clock time and the sending of said coded time information by the respective slave station;

storing in said master station a transmission delay time that elapses between the sending of the coded time information from the respective slave station and the reception of the coded time information at said master station, the duration of one of the frames of information, the time reading of said primary clock when reception of said coded time information from the respective slave station by the master station is completed, and said coded time information; and calculating, from the stored transmission delay time, the time readings of said primary and respective secondary clocks, and the time interval, a time correction for each respective secondary clock relative to said primary clock whereby the reported changes in status can be placed in an accurate time sequence by said master station.

2. The method of claim 1 including calculating a time correction for each secondary clock by:
subtracting the sum of (i) said interval, (ii) said duration, and (iii) said transmission delay for a respective secondary clock from said time reading of said primary clock to obtain a reference time of the respective secondary clock; and
subtracting from said reference time the said time reading of the respective secondary clock.

3. The method of claim 1 including calculating a time correction for each secondary clock by:
adding the sum of (i) said interval, (ii) said duration, and (iii) said transmission delay for a respective secondary clock to said time reading of said respective secondary clock to obtain a reference time of said respective secondary clock; and
subtracting said reference time from said time reading of said primary clock.

* * * * *